(12) United States Patent
Schafer et al.

(10) Patent No.: US 6,594,565 B1
(45) Date of Patent: Jul. 15, 2003

(54) INTELLIGENT LIFT INTERLOCK SYSTEM

(75) Inventors: Gregory E. Schafer, Colfax, CA (US); Edward J. Prokopik, Colfax, CA (US)

(73) Assignee: Intermotive, Inc., Auburn, CA (US)

( * ) Notice: Subject to any disclaimer, the term of this patent is extended or adjusted under 35 U.S.C. 154(b) by 0 days.

(21) Appl. No.: 09/904,834

(22) Filed: Jul. 16, 2001

Related U.S. Application Data

(60) Provisional application No. 60/218,534, filed on Jul. 17, 2000.

(51) Int. Cl.7 .............................. B65G 67/02; B60P 1/44
(52) U.S. Cl. .............................................. 701/36; 701/45
(58) Field of Search .............................. 701/36, 45, 49; 307/10.1; 340/456, 457.3; 414/545, 557; 187/306

(56) References Cited

U.S. PATENT DOCUMENTS

| | | |
|---|---|---|
| 4,420,286 A | 12/1983 | Hanson et al. |
| 4,479,753 A | 10/1984 | Thorley |
| 4,493,603 A | 1/1985 | Williams et al. |
| 4,785,906 A | 11/1988 | Kang |
| 4,804,308 A * | 2/1989 | Hamblin et al. ............. 414/537 |
| 4,892,014 A * | 1/1990 | Morell et al. ................ 192/222 |
| 5,052,879 A | 10/1991 | Wolfe |
| 5,158,419 A | 10/1992 | Kempf et al. |
| 5,205,697 A * | 4/1993 | Getty et al. ............... 244/137.2 |
| 5,228,538 A | 7/1993 | Tremblay |
| 5,373,915 A | 12/1994 | Tremblay |
| 5,533,594 A | 7/1996 | Tremblay et al. |
| 5,672,041 A | 9/1997 | Ringdahl et al. |
| 6,053,693 A | 4/2000 | Ringdahl et al. |

* cited by examiner

Primary Examiner—Michael J. Zanelli
(74) Attorney, Agent, or Firm—Dickinson Wright PLLC

(57) ABSTRACT

A microprocessor controlled system for ensuring the safe operation of an auxiliary device, such as a wheelchair lift used in conjunction with a vehicle. The microprocessor preferably allows operation of the lift device when one or more parameters are met. These parameters include the following: the vehicle is in park, the parking brake is engaged, the vehicle ignition is on, the lift power switch is on, and the lift door is open. The present invention further does not allow the vehicle to shifted out of park if the lift door is open and/or when the parking brake is on.

22 Claims, 2 Drawing Sheets

INTELLIGENT LIFT INTERLOCK SYSTEM

RELATED APPLICATIONS

The present application claims the benefit of the filing date of U.S. Provisional Patent Application Serial No. 60/218,534, which was filed on Jul. 17, 2000.

FIELD OF THE INVENTION

The present invention is directed to a microprocessor based system for use in a vehicle for controlling the operation of various auxiliary devices, such as wheelchair lifts, lift gates, personal lifts, or any other device that requires activation with the vehicle in a secure position.

BACKGROUND OF THE INVENTION

In the last several years, we have witnessed the increased use of various auxiliary lift devices, such as wheelchair lifts, lift gates and personal lifts, which are used to allow persons with disabilities or other infirmities to more easily enter and exit vehicles (such as buses, vans and sport utility vehicles (SUV's)). As can be appreciated, when such devices are used, it is important that the vehicle be prevented from moving during the operation of the auxiliary device, insofar as movement of the vehicle can result in injury to the user. Consequently, the American Disabilities Act (ADA), Title 49, Code of Regulations has implemented various lift interlock requirements to ensure that vehicles will not operate when lift devices are employed.

U.S. Pat. No. 4,420,286, issued to Hanson et al., and U.S. Pat. No. 5,052,879, issued to Wolfe et al., acknowledge that an interlock device used in conjunction with a wheelchair lift, or an invalid lift, must or should be used. For example, Hanson et al. describes an invalid lift apparatus including an interlock switch 186. According to Hanson et al., after the driver brings the vehicle to a stop, the gear shift lever must be placed in the "park" position to close the interlock switch 186, for the invalid lift apparatus to operate.

This patent, however, does not address the use of a parking brake or lift door input as parameters which are also helpful in ensuring that the vehicle will not operate while the lift apparatus is being used. In this respect, the Hanson et al. invention does not lock the vehicle into "park" when the lift door is open, nor when the parking brake is applied, nor does it incorporate system diagnostics and diagnostic displays.

The Wolfe et al. patent is directed to a wheelchair lift and transfer system, and references a "park" cutoff switch 4 (in FIG. 18). The Wolfe et al. system also does not lock the vehicle in "park" when the lift door is open, or when the parking brake is employed, nor does the system incorporate system diagnostics and diagnostic displays.

SUMMARY OF THE INVENTION

The deficiencies of the prior art are addressed by the present invention which is directed to an intelligent lift interlock system used to prevent a vehicle from being moved when a auxiliary device is operated. The auxiliary device used in the present system may include a wheelchair lift, a lift gate, a personal lift, or any other device that requires activation with the vehicle in a secure position. The present invention preferably provides the option of activating or deactivating an auxiliary device only when the vehicle is in park. For instance, the system can be adapted so that an electrically controlled front door can only be activated when the vehicle is in park.

The present invention preferably includes a microprocessor controller for operating the auxiliary device based on transmitting the status of various sensors to the microprocessor. The lift interlock system, including the microprocessor, can be installed in the vehicle as original equipment or can be added at a later time. In this respect, the present invention is preferably designed to use sensors that are already on the vehicle by connecting them to OEM connectors for an easy "plug and play" installation. No cutting of OEM harnesses would be required. The present invention also preferably includes a module having diagnostic display and diagnostic capabilities, as well as a dedicated park output which can drive a relay, lamp, buzzer, or any other external device when the vehicle is in park.

Since the present invention is designed to prevent or reduce injuries associated with allowing various people with disabilities and/or infirmities to exit or enter the vehicle, the auxiliary device should only operate when all of the following conditions are met: 1) the vehicle is in park; 2) the parking brake is applied; 3) the vehicle's ignition is on; 4) the lift power switch is engaged; and 5) the lift door is open. Although the microprocessor utilized in the present invention can allow the operation of the lift device to be activated when one or fewer than all of the above noted conditions are met, for safety reasons, the vehicle lift is preferably operated only when all of these conditions are met. Additionally, the present invention is preferably designed to prevent the vehicle from being shifted out of "park" if the lift door is open, or when the parking brake is applied.

Furthermore, the present invention preferably operates to prevent the vehicle from being shifted out of "park" anytime the parking brake is applied. This feature will eliminate excessive parking brake wear which can occur if the parking brake is inadvertently engaged while driving.

BRIEF DESCRIPTION OF THE DRAWINGS

For a full understanding of the invention, reference is made to the following description taken in conjunction with the accompanying drawings, in which.

DETAILED DESCRIPTION OF THE INVENTION

Figure 1:
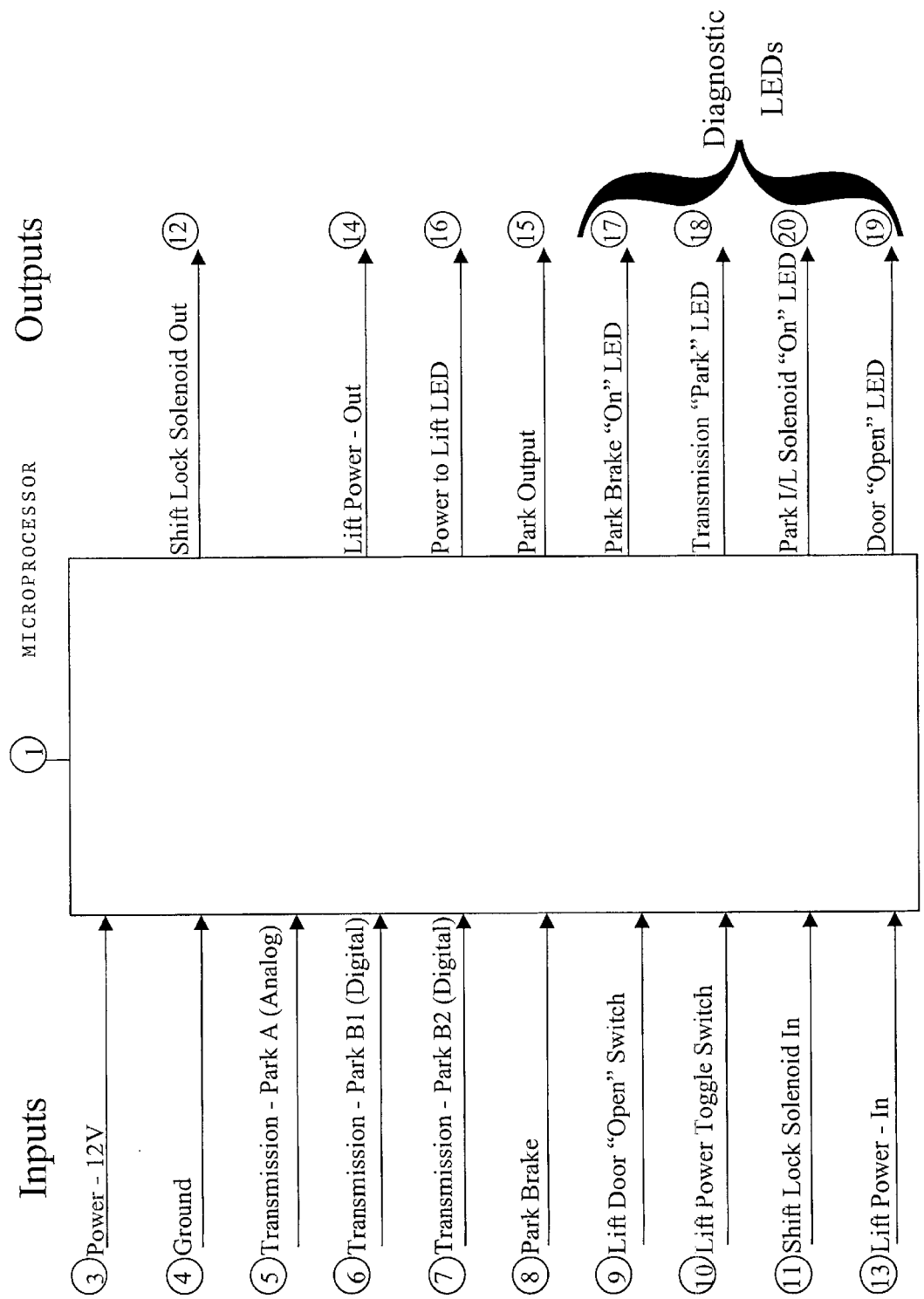
FIG. 1 is a block diagram of the present invention.

FIG. 1 illustrates the various inputs received by a microprocessor 1 as well as the various outputs transmitted from the microprocessor 1. Although various types of microprocessors can be utilized, the present invention preferably employs a microchip PIC 16c5O5 microprocessor. This particular microprocessor contains fourteen (14) available input or output pins utilized to practice the present invention. The input lines shown on the left hand side of FIG. 1 include a power line 3, a ground line 4, an analog transmission-park signal 5, two digital transmission-park signals 6, 7, a parking brake signal 8, a lift door "open" switch 9, a lift power toggle switch 10, a shift lock solenoid (in circuit 11), and a lift power-in circuit 13.

Various outputs are provided from the microprocessor 1 as shown on the right hand side of FIG. 1. These outputs include a shift lock solenoid output 12, a lift power output 14, a park output 15, a power to lift LED 16, and a plurality of diagnostic LEDs which provide output to a status display board 2 (see FIG. 2). These diagnostic LEDs include a parking brake "on" LED 17, a transmission "park" LED 18, a door "open" LED 19, and a park interlock solenoid "on" LED 20.

Figure 2:
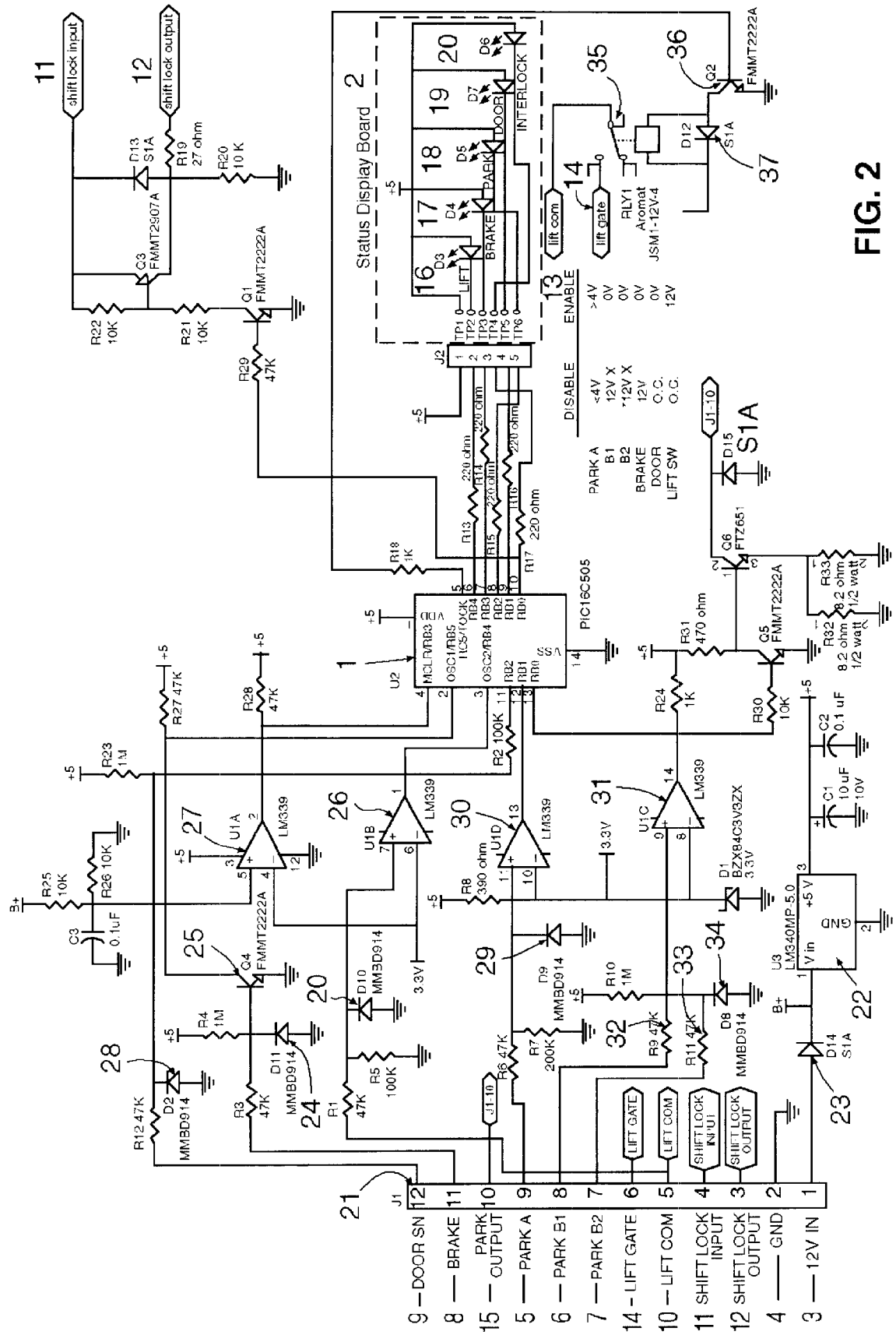
FIG. 2 is a circuit diagram of the microprocessor controlled lift interlock module.

FIG. 2 shows a circuit diagram of the present invention including the reference numerals associated with the various inputs and outputs of microprocessor 1, as described above with respect to FIG. 1. As previously discussed, many of the sensors utilized by the present invention are directly connected to the microprocessor 1 utilizing, for example, an OEM connector 21. Power to operate the microprocessor controller is preferably provided by the vehicle's battery. A standard twelve volt battery can be connected through capacitors C1 and C2 to a step down voltage regulator 22 for dropping the twelve volts to five volts. Capacitor C1 is preferably provided to buffer short power drops without circuit recess. A diode 23 is preferably used for reverse polarity protection. The five volts produced by the step down regulator 22 are preferably provided to the microprocessor 1 at pin 1. This also preferably indicates that the ignition is on. Although it is indicated that a standard twelve volt power source is utilized, it is noted that the vehicle can be powered by other voltage sources, typically between eleven and fourteen volts, although voltages as high as sixteen volts are possible. Regardless of the source of the power, the step down regulator 22 reduces the voltage to a manageable level, such as five volts, to be introduced to the microprocessor 1. A ground circuit is preferably included connected to pin 14 providing ground through the vehicle's chassis.

When the vehicle is stopped and the parking brake is applied, this information is preferably supplied to the microprocessor 1 through pin input 2. A twelve volt input supplied through the vehicle's battery preferably indicates that the brake has not been engaged, whereas a ground input preferably indicates that the brake has been engaged. If the brake input is not properly connected, a "not engaged" signal is preferably sent to pin 2 of the microprocessor 1 to prevent erroneous triggering. The brake 11 is preferably connected to the microprocessor 1 through a circuit including resistors, a signal diode 24, and a transistor used to isolate and protect the microprocessor 1 from input voltage spike and miswiring.

The lift interlock system of the present invention is preferably used to power a lift or similar device only when the vehicle is secured. The lift or similar, device is preferably powered only when a particular switch, such as a toggle or other type of device, is engaged. This switch can be provided at any location in the vehicle, such as in proximity to the lift device, or on the vehicle's dashboard. The circuit provided between the lift power switch 10 and pin 3 of the microprocessor 1 preferably indicates that the lift power switch has been turned to the "on" position. A twelve volt input preferably indicates that the switch is on and a zero volt input preferably indicates that the switch is off. Similar to the parking brake input, an open circuit also preferably indicates the "off" condition. The circuit preferably employs a number of resistors, a signal diode 25, as well as an operational amplifier 26 used to isolate and protect the microprocessor 1 from input voltage spikes or miswiring.

The operation of the microprocessor 1 is preferably protected through the pin 4 utilizing a brownout protection circuit. This circuit ensures the proper reset of the microprocessor 1 if the input voltage drops momentarily, such as to four volts. An operational amplifier 27 is used as a comparator for the four volt threshold. As can be appreciated, this threshold need not be four volts, but could also be slightly lower.

Since the present invention is primarily used to control the operation of a lift device in conjunction with a door of the vehicle, it is important to ensure that the door of the vehicle is open prior to engaging the lift device. Therefore, the circuit between the lift door 9 and pin 11 is preferably used to make this determination. A twelve volt input preferably indicates that the door is closed and a ground input preferably indicates that the door is open. If the input is not connected, the door closed signal is preferably not sent to prevent erroneous triggering. This circuit preferably employs a plurality of resistors and a signal diode 28 to isolate and protect the microprocessor 1 from input volt age spikes or miswiring.

The present invention is preferably adapted to be utilized with a multitude of vehicle types. These vehicles preferably contain transmission devices capable of indicating the position of the transmission device to a dashboard or similar display in the vehicle. Some vehicles can employ a single wire analog signal to indicate that the transmission is in park, and other vehicles can employ a digital or a two-wire park signal. Therefore, the present invention has been designed to be employed by vehicles using an analog signal or a digital signal to indicate whether the transmission is in park. The input to pin 12 of the microprocessor 1 is preferably connected to a circuit providing an analog signal from park input 5. If the vehicle is in park, a signal greater than four volts is preferably transmitted to the microprocessor 1. If the vehicle is not in park, a signal less than four volts is preferably transmitted to the microprocessor 1. If no input is connected to pin 12, the microprocessor 1 preferably looks to pin 13 which is used to connect the digital park inputs to the microprocessor 1. The circuitry between the analog signal and pin 12 preferably includes resistors, a signal diode 29, as well as an operational amplifier 30 used to isolate and protect the microprocessor 1 from input voltage spikes or miswiring. The operational amplifier 30 is also preferably used to determine the four volt threshold by being used as a comparator. Since operational amplifiers typically are provided in a quad configuration (4 per chip), the three other operation amplifiers shown in this circuit are preferably used for signal isolation in other input circuits.

Pin 13 of microprocessor 1 preferably receives a signal generated by a digital transmission park input. The signals produced by the two digital transmission park inputs are preferably monitored at a point between two series resistors, 32, 33. If both inputs are zero, the vehicle is in park, and if either of the inputs are at twelve volts, the vehicle is not in park. As was true with a number of the other circuits of the present invention, the present circuit includes a signal diode 34, as well as an operational amplifier 31 used to isolate and protect the microprocessor from input voltage spikes or miswiring. This circuit can also be used as a park output circuit. When the vehicle is in park, it can preferably ground up to 500 milliamps of a load, such as a buzzer or lamp. This can be accomplished through a series of resistors and transistors. By slightly changing the circuit, the analog park transmission sensor can also be used to operate a load.

In this respect, the present invention can be adapted such that a circuit is provided to operate an auxiliary device, such as a front door, only when the vehicle is in the park position. When utilized with a digital park transmission sensor, pin 13 preferably receives a low (0 v) signal through op-amp 31. This signal can also be transmitted to transistor Q5. Since transistor Q5 is an NPN transistor, the low signal switches Q5 off, and when this occurs, transistor Q6 is preferably switched on. Transistor Q6 is connected to pin 10 which in turn can be connected to an auxiliary device such as a door. When transistor Q6 is on, it preferably converts the auxiliary device to ground through two 8.2 ohm resistors to prevent damage to the transistor Q6 in the event it is directly shorted to power. Diode 15 is preferably used to protect against voltage spikes. Although the present invention has been described with respect to the digital park transmission sensor, it could also be operated if an analog sensor is employed.

Pins 6, 7, 8, 9 and 10 are preferably used to provide outputs from the microprocessor 1 to a status display board 2, provided on or close to the vehicle's dashboard. These signals are preferably used to indicate the status of various devices used in the lift interlock system. This system preferably operates only when the following conditions are met: the vehicle is in park, the parking brake is engaged, the vehicle ignition is on, the lift power switch is on, and the lift door is open. Since the vehicle's battery provides power to the interlock, operating this system with the ignition on could lead to a low battery voltage condition, i.e., if the interlock system is operated for a long time while the vehicle is parked. Once the microprocessor recognizes the existence of all of these (or in some instances a combination the these signals), relay 35, via pin 5, is preferably engaged through transistor 36 and the lift or similar device preferably begins to operate. This circuit is preferably protected for inductive voltage spikes from the relay coil 35 by a diode 37. This switching system can be connected to either power or ground depending upon the type of switching desired by the user. If all of the parameters for the lift have been met, a lift power LED 16 is preferably illuminated using a five volt supply and by grounding the circuit. A 220 ohm resistor is preferably used to limit the current to the LED.

LED 17 is preferably illuminated through pin 7 only when the parking brake is employed. As was true with respect to the lift power LED, this Led is applied with five volts by grounding the circuit, wherein the LED will illuminate, and preferably employs a 220 ohm resistor to limit the current to the LED 17.

LED 18 is preferably illuminated through pin 8 only when the vehicle is in park. The LED 18 is preferably supplied with five volts of power by grounding the circuit, wherein the LED will illuminate. Similar to the other circuits previously described, the 220 ohm resistor is preferably used to limit the current to the LED.

Pin 9 is preferably connected to LED 19 which illuminates only when the lift door is open. As was true with the previously described circuits, the LED is supplied with five volts of power and by grounding the circuit, the LED will be illuminated. Furthermore, a 220 ohm resistor is preferably used to limit the current to the LED.

The present invention will operate to prevent the vehicle to be shifted out of park if the lift door is open or if the parking brake is on. Presently, the majority of vehicles on the road are provided with a solenoid for locking the shift mechanism in the park position until the driver steps on the brake petal. The microprocessor 1 preferably intercepts that signal and opens and closes the circuit to the solenoid output circuit. Connecting this circuit to the solenoid output circuit allows the vehicle to be shifted out of park. If, however, the lift door is open or the parking brake is applied, this circuit will preferably be open and diverted to ground. If the vehicle does not have such a solenoid, it can be added.

Pin 10 is preferably connected to both this shift lock solenoid and a shift lock LED 20. The output circuit, including LED 20, is preferably grounded if the vehicle's lift door is in the open position and/or the parking brake is engaged. As was true with the previously described circuits, the LED is preferably supplied with five volts of power and by grounding the circuit, wherein the LED will illuminate. A 220 ohm resistor is preferably used to limit the current to the LED. This circuit also preferably locks the vehicle's brake shift interlock so that the vehicle cannot be shifted out of park. This can be accomplished through a series of resistors and transistors.

As can be appreciated, the signal lights 16, 17, 18, 19 and 20 have been described as being LEDs. It can be appreciated that this type of signal indication can be varied as well as the colors produced by the illumination devices. The microprocessor of the present invention can perform self diagnostics every time the vehicle is started. This is true since each of the aforementioned LEDs will be momentarily illuminated when the vehicle's ignition is initially turned on. The LEDs would then be turned off at a predetermined time after the initial engagement, such as one second. The use of the dash mounted LED panel displays could also be utilized as a device for diagnosing problems of the present invention.

It will thus be seen that the objects set forth above, among those made apparent from the preceding description, are additionally attained, and, since certain changes may be made to carry out the above process, and in the construction set forth, without departing from the spirit and scope of the invention, it is intended that all matter contained in the above description and shown in the accompanying drawing shall be interpreted as illustrative and not as limitations.

It is also to be understood that the following claims are intended to cover all of the generic and specific features of the invention herein described and all statements of the scope of the invention which, is a matter of language, might be set to fall therebetween.

What is claimed is:

1. An interlock circuit for use in a vehicle having a battery, a gear shift lever, and a parking brake, to prevent the operation of said vehicle when an auxiliary device is turned on or is in an operational state, said circuit comprising:

a microprocessor; and a plurality of sensors connected to said microprocessor for sensing various parameters, said sensors comprising a sensor for sensing when said auxiliary device is turned on or is in said operational state, a gear shift lever sensor for sensing when the gear shift lever is in the park position, and a parking brake sensor for sensing whether the parking brake is engaged, wherein the gear shift lever is prevented from being shifted out of park when said auxiliary device is turned on or is in said operational state, or when the parking brake is engaged.

2. The interlock circuit in accordance with claim 1, wherein the auxiliary device is a lift device operable through one of said vehicle's doors, and wherein one of said sensors senses whether the door associated with said lift device is open, wherein the gear shift lever is prevented from being shifted out of park if either the parking brake is engaged or the lift door is open.

3. The interlock circuit in accordance with claim 2, further comprising a solenoid circuit connected to said microprocessor and said gear shift lever to prevent said gear shift lever from being shifted out of park if either the parking brake is engaged or the lift door is open.

4. The interlock circuit in accordance with claim 2, further comprising a visual display for displaying the status of at least one of said plurality of sensors, said visual display being connected to said microprocessor.

5. The interlock circuit in accordance with claim 4, wherein said visual display comprises at least one light-emitting diode.

6. The interlock circuit in accordance with claim 1, further comprising a circuit for operating said microprocessor through the vehicle's battery, said circuit comprising a step down voltage regulator connected between said microprocessor and said battery.

7. The interlock circuit in accordance with claim 1, further comprising a filter circuit provided between at least one of said sensors and said microprocessor for isolating said microprocessor from any voltage spikes.

8. The interlock circuit in accordance with claim 7, wherein a filter circuit is provided between each of said sensors and said microprocessor.

9. The interlock circuit in accordance with claim 1, wherein said gear shift lever sensor is a digital or analog sensor.

10. An interlock circuit for use in a vehicle having a battery, a gear shift lever, and a parking brake, to prevent the operation of a lift device having an ON/OFF switch operable through a door of said vehicle, wherein said lift device is prevented from operating unless said vehicle is in a secure position, comprising:
 a microprocessor;
 a plurality of sensors connected to said microprocessor, said sensors being connected to various vehicle components and capable of sensing various conditions relating to whether said vehicle is in a secure position; and
 a circuit connected to said microprocessor and said lift device for preventing the operation of said lift device unless at least one of said various conditions is present.

11. The interlock circuit in accordance with claim 10, wherein said various conditions are taken from the group consisting of: whether the gear shift lever is in park, whether the parking brake is engaged, whether the vehicle's ignition is ON, whether the lift device is ON, and whether the vehicle's door through which the lift device operates is open.

12. The interlock circuit in accordance with claim 10, wherein the lift device will not operate unless all of said various conditions are met.

13. The interlock circuit in accordance with claim 11, wherein the lift device will not operate unless all of said various conditions are met.

14. The interlock circuit in accordance with claim 10, further comprising a visual display for displaying the status of said sensors.

15. The interlock circuit in accordance with claim 10, further comprising a filter circuit provided between at least one of said sensors and said microprocessor for isolating said microprocessor from any voltage spikes.

16. The interlock circuit in accordance with claim 15, wherein a filter circuit is provided between each of said sensors and said microprocessor.

17. The interlock circuit in accordance with claim 10, further comprising an auxiliary device operable only when said gear shift lever is in park.

18. An interlock circuit for use in a vehicle having a battery, a gear shift lever, and a parking brake, to prevent the operation of said vehicle when an auxiliary device is turned on or is in an operational state, said circuit comprising:
 a microprocessor; and
 at least one sensor for sensing when said auxiliary device is turned on or is in said operational state, wherein said circuit is adapted to prevent said gear shift lever from being shifted out of park when said auxiliary device is turned on or is in said operational state.

19. The interlock circuit of claim 18, wherein said circuit has a parking brake sensor for sensing whether the parking brake is engaged, wherein the gear shift lever may not be shifted out of park when the parking brake is engaged.

20. The interlock circuit of claim 18, wherein the auxiliary device is a lift device operable through one of said vehicle's doors, and wherein a sensor senses whether the door associated with said lift device is open, wherein the gear shift lever is prevented from being shifted out of park if the lift door is open.

21. An interlock circuit for use in a vehicle having a battery, a gear shift lever, and a parking brake, said circuit comprising:
 a microprocessor; and
 a plurality of sensors connected to said microprocessor for sensing various parameters, said sensors comprising a gear shift lever sensor for sensing when the gear shift lever is in the park position, and a parking brake sensor for sensing whether the parking brake is engaged, wherein the gear shift lever is prevented from being shifted out of park when the parking brake is engaged.

22. The interlock circuit of claim 21, wherein said sensors comprises a sensor for sensing when a lift device operable through one of said vehicle's doors is turned on or is in an operational state, wherein the gear shift lever is prevented from being shifted out of park when said lift device is turned on or is in said operational state.

* * * * *

(12) INTER PARTES REEXAMINATION CERTIFICATE (0212th)
United States Patent
Schafer et al.

(10) Number: US 6,594,565 C1
(45) Certificate Issued: Nov. 30, 2010

(54) INTELLIGENT LIFT INTERLOCK SYSTEM

(75) Inventors: Gregory E. Schafer, Colfax, CA (US); Edward J. Prokopik, Colfax, CA (US)

(73) Assignee: Intermotive, Inc., Auburn, CA (US)

Reexamination Request:
No. 95/000,171, Aug. 3, 2006

Reexamination Certificate for:
Patent No.: 6,594,565
Issued: Jul. 15, 2003
Appl. No.: 09/904,834
Filed: Jul. 16, 2001

Related U.S. Application Data

(60) Provisional application No. 60/218,534, filed on Jul. 17, 2000.

(51) Int. Cl.
*B65G 67/02* (2006.01)
*B60P 1/44* (2006.01)

(52) U.S. Cl. .......................................... 701/36; 701/45
(58) Field of Classification Search .................... 701/36, 701/45, 49; 308/10.1; 340/456, 457.3
See application file for complete search history.

(56) References Cited

U.S. PATENT DOCUMENTS

| | | | |
|---|---|---|---|
| 3,651,965 A | 3/1972 | Simonelli et al. | |
| 4,027,807 A | 6/1977 | Thorley | |
| 4,039,091 A | 8/1977 | Adamski et al. | |
| 4,270,630 A | 6/1981 | Karkau | |
| 4,420,286 A | 12/1983 | Hanson et al. | |
| 4,507,736 A | 3/1985 | Klatt | |
| 4,768,610 A | 9/1988 | Pagel et al. | |
| 4,804,308 A | 2/1989 | Hamblin et al. | |
| 5,180,275 A | 1/1993 | Czech et al. | |
| 5,188,069 A | 2/1993 | Fiorenza, II | |
| 5,614,883 A | 3/1997 | Dery et al. | |
| 5,632,593 A | 5/1997 | Aoki | |
| 5,672,041 A | 9/1997 | Ringdahl et al. | |
| 5,839,304 A | 11/1998 | Wills | |
| 5,842,384 A | 12/1998 | Berger | |
| 5,865,593 A | 2/1999 | Cohn | |
| 6,071,064 A | 6/2000 | Hackett | |
| 6,236,905 B1 | 5/2001 | Whitmarsh | |

OTHER PUBLICATIONS

Francis, Gerald A. and Norstrom, David, "Guideline Specifications for Passive Lifts, Active Lifts, Wheelchair Ramps and Securement Devices", Federal Transit Administration.
Sep. 1992, Passive Lifts Section pp. 1–30, Vehicle Ramps Section pp. 1–14, Revised Edition, U.S. Department of Transportation, Washington, D.C., USA.
Schiavone, John J., TCRP Report 43: Understanding and Applying Advanced On–Board Bus Electronics, Jan. 1999, pp. 1–101, National Academy Press, Washington, D.C., USA.
Schiavone, John, TCRP Report 43: Understanding and Applying Advanced On–Board Bus Electronics, Jan. 1, 1999, Series, 1 pg., CRIC Library Coll., Transportation Research Board, USA.
Publication Series, TCRP Report, Transportation Research Board, USA, Publication Series–TCRP Report–TRB.org, http://trb.org/news/blurb browse.asp?id=1, Apr. 17, 2006, 2 pgs., USA.
Perier, L./Coen, A., "ST7/ST10/U435 Can–do Solutions for Car Multiplexing", 1998, pp. 1–16, STMicroelectronics, http://www.st.com.

(Continued)

*Primary Examiner*—Matthew C. Graham

(57) ABSTRACT

A microprocessor controlled system for ensuring the safe operation of an auxiliary device, such as a wheelchair lift used in conjunction with a vehicle. The microprocessor preferably allows operation of the lift device when one or more parameters are met. These parameters include the following: the vehicle is in park, the parking brake is engaged, the vehicle ignition is on, the lift power switch is on, and the lift door is open. The present invention further does not allow the vehicle to shifted out of park if the lift door is open and/or when the parking brake is on.

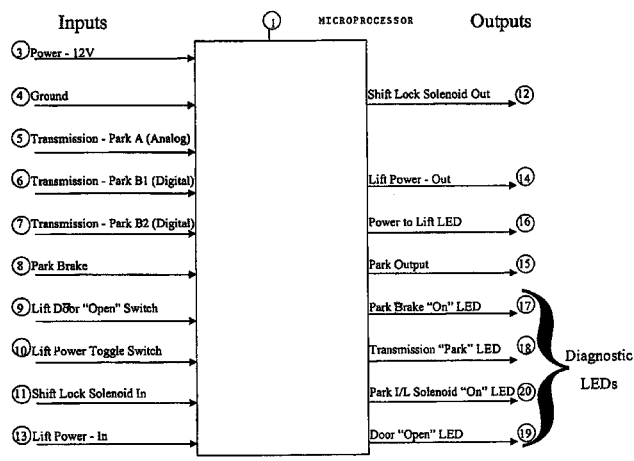

OTHER PUBLICATIONS

Real, Mimi, A Revolution In Progress . . . A History of Intel to Date, Products and Process—Components, 1984, 1–53, Intel Corporation.

Walker, Gerald M., Microprocessors:Consumer/commercial Microprocessors go public, Electronics Book Series, 1975, pp. 126, 147, McGraw–Hill, Inc., New York, USA.

Motorola, Inc., Motorola Series in Solid–State Electronics: Microprocessor Applications Manual, 1975, pp. 5–1, McGraw–Hill Book Company, USA.

Scientific American, Microelectronics, Sep. 1977, vol. 237, No. 3, pp. 3, 65, 67, 160, 188 and 190, New York, USA.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 21 is confirmed.

Claims 11-13 and 19 are cancelled.

Claims 1, 2, 10, 18 and 22 are determined to be patentable as amended.

Claims 3-9, 14-17 and 20, dependent on an amended claim, are determined to be patentable.

1. An interlock circuit for use in a vehicle having a battery, a gear shift lever, and a parking brake, to prevent the operation of said vehicle when an auxiliary device is turned on or is in an operational state, *said auxiliary device having an ON/OFF switch operable through a door of said vehicle, wherein said auxiliary device is prevented from operating unless said vehicle is in a secure position,* said circuit comprising: a microprocessor; and a plurality of sensors connected to said microprocessor for sensing various parameters, said sensors comprising a sensor for sensing when said auxiliary device is turned on or is in said operational state *as a separate parameter*, a gear shift lever sensor for sensing when the gear shift lever is in the park position [and] *as a separate parameter*, a parking brake sensor for sensing whether the parking brake is engaged *as a separate parameter, a vehicle ignition sensor for sensing whether the vehicle's ignition is ON as a separate parameter, an auxiliary device sensor for sensing whether the auxiliary device is ON as a separate parameter, and an auxiliary device door sensor for sensing whether the vehicle's door through which the auxiliary device operates is open as a separate parameter;* wherein the gear shift lever is prevented from being shifted out of park when said auxiliary device is turned on or is in said operational state, or when the parking brake is engaged; *and a circuit connected to the microprocessor and the auxiliary device for preventing operation of the auxiliary device unless all separate parameters are met.*

2. The interlock circuit in accordance with claim 1, wherein the auxiliary device is a lift device[operable through one of said vehicle's doors, and wherein one of said sensors senses whether the door associated with said lift device is open, wherein the gear shift lever is prevented from being shifted out of park if either the parking brake is engaged or the lift door is open].

10. An interlock circuit for use in a vehicle having a battery, a gear shift lever, and a parking brake, to prevent the operation of a lift device having an ON/OFF switch operable through a door of said vehicle, wherein said lift device is prevented from operating unless said vehicle is in a secure position, comprising: a microprocessor; a plurality of sensors connected to said microprocessor, said sensors being connected to various vehicle components and capable of sensing various conditions relating to whether said vehicle is in a secure position *wherein said various conditions are taken from the group consisting of: 1) whether the gear shift lever is in park, 2) whether the parking brake is engaged, 3) whether the vehicle's ignition is ON, 4) whether the lift device is ON, and 5) whether the vehicle's door through which the lift device operates is open;* and a circuit connected to said microprocessor and said lift device for preventing the operation of said lift device unless [at least one] *all* of said various conditions [is present] *are met*.

18. An interlock circuit for use in a vehicle having a battery, a gear shift lever, and a parking brake, to prevent the operation of said vehicle when an auxiliary device is turned on or is in an operational state, said circuit comprising: a microprocessor; and at least one sensor for sensing when said auxiliary device is turned on or is in said operational state, wherein said circuit is adapted to prevent said gear shift lever from being shifted out of park when said auxiliary device is turned on or is in said operational state *and when said parking brake is engaged*.

22. The interlock circuit of claim 21, wherein said sensors [comprises] *comprise* a sensor for sensing when a lift device operable through one of said vehicle's doors is turned on or is in an operational state, wherein the gear shift lever is prevented from being shifted out of park when said lift device is turned on or is in said operational state.

\* \* \* \* \*

(12) EX PARTE REEXAMINATION CERTIFICATE (8988th)

United States Patent
Schafer et al.

(10) Number: US 6,594,565 C2
(45) Certificate Issued: Apr. 24, 2012

(54) INTELLIGENT LIFT INTERLOCK SYSTEM

(75) Inventors: Gregory E. Schafer, Colfax, CA (US); Edward J. Prokopik, Colfax, CA (US)

(73) Assignee: Intermotive, Inc., Auburn, CA (US)

Reexamination Request:
No. 90/011,217, Oct. 11, 2010

Reexamination Certificate for:
Patent No.: 6,594,565
Issued: Jul. 15, 2003
Appl. No.: 09/904,834
Filed: Jul. 16, 2001

Reexamination Certificate C1 6,594,565 issued Nov. 30, 2010

Related U.S. Application Data

(60) Provisional application No. 60/218,534, filed on Jul. 17, 2000.

(51) Int. Cl.
*B65G 67/02* (2006.01)
*B60P 1/44* (2006.01)

(52) U.S. Cl. .......................................... 701/36; 701/45
(58) Field of Classification Search ....................... None
See application file for complete search history.

(56) References Cited

To view the complete listing of prior art documents cited during the proceeding for Reexamination Control Number 90/011,217, please refer to the USPTO's public Patent Application Information Retrieval (PAIR) system under the Display References tab.

*Primary Examiner* — Patricia Engle

(57) ABSTRACT

A microprocessor controlled system for ensuring the safe operation of an auxiliary device, such as a wheelchair lift used in conjunction with a vehicle. The microprocessor preferably allows operation of the lift device when one or more parameters are met. These parameters include the following: the vehicle is in park, the parking brake is engaged, the vehicle ignition is on, the lift power switch is on, and the lift door is open. The present invention further does not allow the vehicle to shifted out of park if the lift door is open and/or when the parking brake is on.

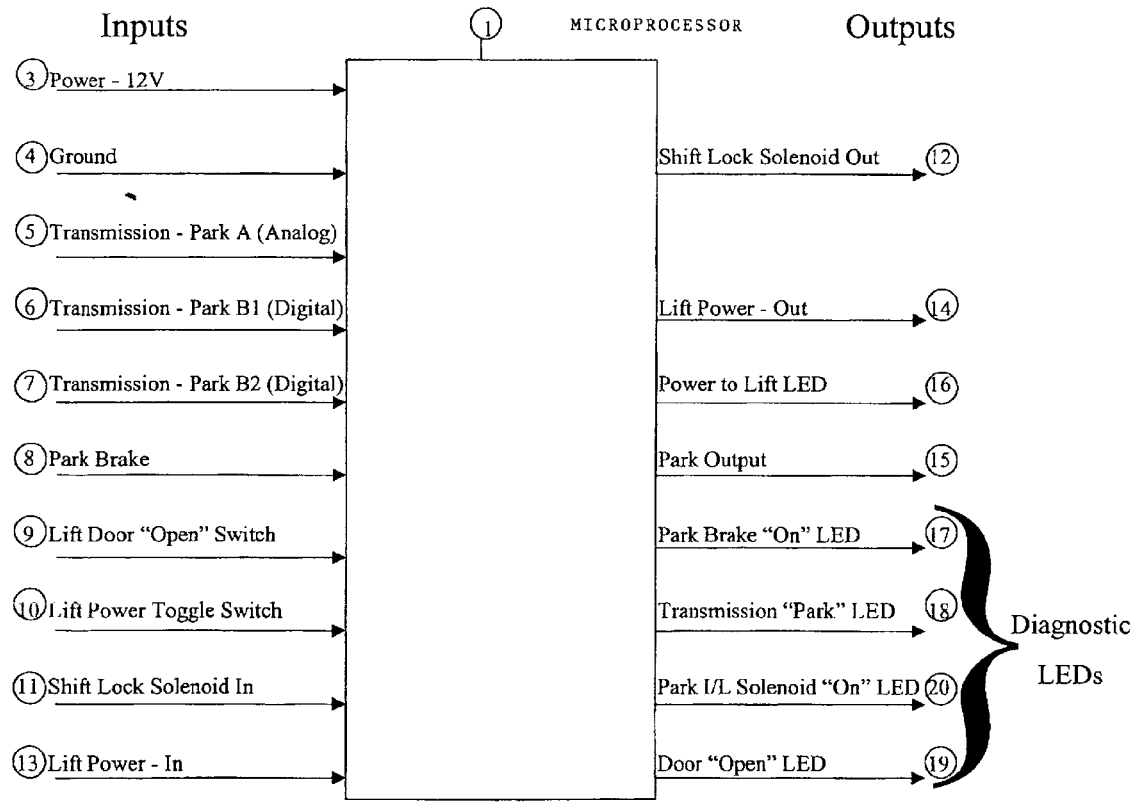

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 18, 20, 21 and 22 is confirmed.

Claims 11-13 and 19 were previously cancelled.

New claims 23-30 are added and determined to be patentable.

Claims 1-10 and 14-17 were not reexamined.

23. *An interlock circuit for use in a vehicle having a battery, a gear shift lever, and a parking brake, to prevent the operation of said vehicle when a wheelchair lift device is turned on or is in an operational state, said circuit comprising: a microprocessor; and at least one sensor for sensing when said wheelchair lift device is turned on or is in said operational state, wherein said circuit is adapted to prevent said gear shift lever from being shifted out of park when said wheelchair lift device is turned on or is in said operational state and when said parking brake is engaged.*

24. *The interlock circuit of claim 23, wherein said wheel chair lift device is operable through one of said vehicle's doors, and wherein a sensor senses whether the door associated with said wheelchair lift device is open, wherein the gear shift lever is prevented from being shifted out of park if the door associated with said wheelchair lift device is open.*

25. *An interlock circuit for use in a vehicle having a battery, a gear shift lever, and a parking brake, said circuit comprising: a microprocessor; and a plurality of sensors connected to said microprocessor for sensing various parameters, said sensors comprising a sensor for sensing when a wheelchair lift device operable through one of said vehicle's doors is turned on or is in an operational state, a gear shift lever sensor for sensing when the gear shift lever is in the park position, and a parking brake sensor for sensing whether the parking brake is engaged, wherein the gear shift lever is prevented from being shifted out of park when the parking brake is engaged and when said wheelchair lift device is turned on or is in said operational state.*

26. *An interlock circuit for use in a vehicle having a battery, a gear shift lever, and a parking brake, said circuit comprising: a microprocessor; and a plurality of sensors connected to said microprocessor for sensing various parameters, said sensors comprising a gear shift lever sensor for sensing the gear shift lever position, and a parking brake sensor for sensing whether the parking brake is not engaged, wherein the gear shift lever is allowed to be shifted out of a park position when the parking brake is not engaged.*

27. *The interlock circuit of claim 26, wherein said sensors comprise a sensor for sensing when a lift device operable through one of said vehicle's doors is turned off or is not in an operational state, wherein the gear shift lever is allowed to be shifted out of park when said lift device is turned off or is not in said operational state.*

28. *The interlock circuit of claim 27, wherein said lift device comprises an assembly for lifting at least one wheelchair.*

29. *An interlock circuit for use in a vehicle having a battery, a gear shift lever, and a parking brake, said circuit comprising: a microprocessor; and a plurality of sensors connected to said microprocessor for sensing various parameters, said sensors comprising a sensor for sensing when a wheelchair lift device operable through one of said vehicle's doors is turned off or is not in an operational state, a gear shift lever sensor for sensing the gear shift lever position, and a parking brake sensor for sensing whether the parking brake is not engaged, wherein the gear shift lever is allowed to be shifted out of park when the parking brake is not engaged and when said wheelchair lift device is turned off or is not in said operational state.*

30. *The interlock circuit of claim 22, wherein said lift device comprises an assembly for lifting at least one wheelchair.*

\* \* \* \* \*